United States Patent
Bilcai et al.

(10) Patent No.: US 8,790,779 B2
(45) Date of Patent: Jul. 29, 2014

(54) ADHESIVE FILM OR ADHESIVE TAPE BASED ON EPOXIDES

(75) Inventors: Eugen Bilcai, Oberschleissheim (DE); Emilie Barriau, Laguna Niguel, CA (US); Martin Renkel, Duesseldorf (DE); Sven Wucherpfennig, Dormagen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/297,380

(22) Filed: Nov. 16, 2011

(65) Prior Publication Data

US 2012/0121878 A1 May 17, 2012

Related U.S. Application Data

(63) Continuation of application No. PCT/EP2009/066346, filed on Dec. 3, 2009.

(30) Foreign Application Priority Data

May 28, 2009 (DE) .......................... 10 2009 026 548

(51) Int. Cl.
| | |
|---|---|
| B32B 1/08 | (2006.01) |
| B32B 27/18 | (2006.01) |
| B32B 27/38 | (2006.01) |
| C09J 163/00 | (2006.01) |
| C08L 63/00 | (2006.01) |
| C08K 3/00 | (2006.01) |
| C08K 5/00 | (2006.01) |

(52) U.S. Cl.
USPC ..................... 428/414; 428/220; 428/355 EP; 428/416; 428/418; 521/135; 521/178; 523/400; 523/457; 525/523; 525/529; 525/530; 525/533

(58) Field of Classification Search
None
See application file for complete search history.

(56) References Cited

U.S. PATENT DOCUMENTS

| | | | |
|---|---|---|---|
| 3,937,641 | A | 2/1976 | Kushner et al. |
| 5,274,006 | A | 12/1993 | Kagoshima et al. |
| 5,453,186 | A | 9/1995 | Mueller et al. |
| 6,046,257 | A * | 4/2000 | Oosedo et al. ................ 523/428 |
| 6,582,824 | B1 * | 6/2003 | Weigl et al. .................... 428/413 |
| 6,861,138 | B1 | 3/2005 | Pfaff et al. |
| 7,241,502 | B2 | 7/2007 | Anselmann et al. |
| 7,429,419 | B2 | 9/2008 | Ring et al. |
| 7,473,717 | B2 | 1/2009 | Muenz et al. |
| 2004/0159969 | A1 | 8/2004 | Truog et al. |
| 2004/0228998 | A1 | 11/2004 | Haas |
| 2006/0191623 | A1 | 8/2006 | Lutz et al. |
| 2006/0276601 | A1 * | 12/2006 | Lutz et al. ..................... 525/528 |
| 2008/0188609 | A1 | 8/2008 | Agarwal et al. |
| 2008/0251203 | A1 * | 10/2008 | Lutz et al. ..................... 156/330 |
| 2009/0104448 | A1 * | 4/2009 | Thompson et al. ........... 428/413 |
| 2009/0176903 | A1 | 7/2009 | Muenz et al. |
| 2010/0009196 | A1 * | 1/2010 | Kramer et al. ................ 428/413 |
| 2010/0035041 | A1 * | 2/2010 | Kramer et al. ............ 428/320.2 |
| 2010/0087567 | A1 * | 4/2010 | Finter et al. ................... 523/400 |
| 2011/0257285 | A1 | 10/2011 | Barriau et al. |

FOREIGN PATENT DOCUMENTS

| | | | |
|---|---|---|---|
| DE | 2538061 | 3/1976 | |
| DE | 19912628 | 1/2000 | |
| DE | 10163248 | 7/2003 | |
| DE | 102004031190 | 1/2006 | |
| DE | 102006048739 | 4/2008 | |
| DE | 102008053520 | 5/2010 | |
| DE | 102008053518 | 6/2010 | |
| EP | 0 337 144 | 5/1992 | |
| EP | 1 033 393 | 9/2000 | |
| EP | 1 469 020 | 10/2004 | |
| WO | 9916618 | 4/1999 | |
| WO | 0027920 | 5/2000 | |
| WO | 2004111136 | 12/2004 | |
| WO | 2006044376 | 4/2006 | |
| WO | 2006053640 | 5/2006 | |
| WO | 2007004184 | 1/2007 | |
| WO | 2007025007 | 3/2007 | |
| WO | WO 2008049859 A1 * | 5/2008 | ............. C08G 18/28 |
| WO | WO 2008049860 A1 * | 5/2008 | ............. C08G 18/10 |
| WO | WO 2008113845 A1 * | 9/2008 | ............. C08G 18/12 |
| WO | 2010049221 | 5/2010 | |

OTHER PUBLICATIONS

International Search Report issued in connection with International Patent Application No. PCT/EP2009/066346 mailed on Jan. 29, 2010.
Database WPI Week 200332.

* cited by examiner

*Primary Examiner* — Michael J Feely
(74) *Attorney, Agent, or Firm* — Steven C. Bauman; James E. Piotrowski

(57) ABSTRACT

A thermally curable adhesive in strip or film form, having a thickness in the range of 0.1 to 5 mm, containing: a) at least one reactive epoxy prepolymer, b) at least one latent hardener for epoxies, and c) one or more elastomers that are selected from: c1) thermoplastic polyurethanes, c2) thermoplastic isocyanates, and c3) block copolymers having thermoplastic polymer blocks. Further components can additionally be contained, for example a blowing agent for foaming. The adhesive in the uncured state at 22° C. is bendable or wrappable and can be extended at least 100% before tearing. It can be laid onto a foil. It can be used, for example, for adhesive bonding of planar, tubular, or cylindrical components, preferably components made of metal, wood, ceramic, or ferrites.

9 Claims, No Drawings

ADHESIVE FILM OR ADHESIVE TAPE BASED ON EPOXIDES

The present invention relates to a bendable (flexible and extensible) adhesive film based on reactive epoxies and corresponding hardeners, which is thermally hardenable. It can easily be wrapped manually onto objects to be joined, and is suitable, for example, for adhesively bonding pipes to one another.

The adhesive bonding of pipes using an adhesive in strip form is known, for example, from the German Application DE 2538061 A1. According to this, the adhesive film is wrapped around the end portion of the one pipe, after which said end portion is inserted into a flared end portion of the other pipe. As a result of heating, firstly the adhesive liquefies, fills the gap between the walls of the two end pieces, and then cures. An epoxy adhesive agent that is solid at room temperature, and that comprises a braid of unwoven Dacron fibers, is preferably used for this.

U.S. Pat. No. 5,274,006 likewise describes an epoxy-based adhesive agent that can be manufactured, for example, as a strip having a thickness of 2 mm. It contains a liquid epoxy resin prepolymer, a latent hardener for the epoxy resin, a blowing agent for foaming, and a further polymer selected from rubber-like elastomers and thermoplastic resins.

WO 00/27920 discloses expandable sealing and damping compositions that are mixtures of a thermoplastic resin resp. multiple thermoplastic resins and an epoxy resin. The following are recited as examples of thermoplastic resins: solid rubbers such as styrene-butadiene rubbers and nitrile-butadiene rubbers, or polystyrene polymers such as, for example, SBS block copolymers. The epoxy resin is preferably liquid.

German patent application DE 10 2006 048739 describes binding agents for manufacturing expandable, thermally hardenable shaped elements that contain at least one epoxy resin, at least one polyester that is solid at room temperature, at least one blowing agent, at least one hardener, and at least one filler. "Flexibilizing agents" can additionally be contained. Solid rubbers are recited, for example, as flexibilizing agents. Examples of suitable solid rubbers are polybutadiene, styrene-butadiene rubber, butadiene-acrylonitrile rubber, EPDM, synthetic or natural isoprene rubber, butyl rubber, or polyurethane rubber. Partly crosslinked solid rubbers based on isoprene-acrylonitrile copolymers or butadiene-acrylonitrile copolymers are particularly suitable.

WO 2007/004184 describes a thermally foamable material that contains the following components: a solid epoxy resin that is substantially free of liquid or semi-solid epoxy resin, an impact improver, a hardener, and a heat-activatable blowing agent. The impact improver in this context can represent a thermoplastic material. The following are recited, for example: epoxy-polyurethane hybrids and isocyanate prepolymers (for example, isocyanate-terminated polyether polyols) that have a molar mass in the range between 1000 and 10,000 g/mol. A number of block copolymers are also recited as impact improvers. These can have a core-shell structure.

WO 2007/025007 discloses a composition having the following components: at least one epoxy resin, rubber particles having a core-shell structure, a further impact modifier resp. toughness improver, and a heat-activatable latent hardener. The composition can additionally contain blowing agents so that it can be used as a structural foam. Recited as components c) are, for example, polyurethanes that derive from hydroxyl-terminated polyoxyalkylenes such as, for example, polypropylene glycol or polytetrahydrofurandiol. These should exhibit thermoplastic behavior. Instead of or in addition to these, block copolymers can also be present, for example those in which at least one polymer block has a glass temperature below 20° C. (by preference below 0° C. or below −30° C. or below −50° C.), for example a polybutadiene block or a polyisoprene block. At least one further block of the block copolymer has a glass temperature above 20° C. (by preference above 50° C. or above 70° C.), for example a polystyrene block or a polymethyl methacrylate block. Specific examples that are recited are: styrene-butadiene-methyl methacrylate block copolymers, methyl methacrylate-butadiene-methyl methacrylate block copolymers, and butadiene-methyl methacrylate block copolymers.

The previously undisclosed German patent application DE 10 2008 053518 describes a thermally expandable and hardenable compound containing
a) at least one epoxy prepolymer,
b) at least one heat-activatable hardener for the prepolymer,
c) at least one blowing agent,
d) at least one thermoplastic polyurethane or isocyanate,
e) at least one block copolymer.
This compound can additionally contain as components
f) rubber particles, by preference those having a core-shell structure,
and/or
g) inorganic particles
that comprise a casing made of organic polymers.

The previously undisclosed German patent application DE 10 2008 053520 describes a thermally expandable and hardenable compound containing
a) at least one epoxy prepolymer,
b) at least one heat-activatable hardener for the prepolymer,
c) at least one blowing agent,
d) at least one thermoplastic, nonreactive polyurethane that is selected from polyurethanes that contain a polyester chain.

Neither of the two German patent applications recited above provides any suggestion to make the compounds described therein available in the form of a bendable or wrappable film.

The present invention addresses the object of making a thermally hardenable adhesive agent available in the form of a bendable or wrappable film that, depending on the intended use, is thermally expandable ("foamable") or not thermally expandable. The adhesive is intended to be extensible by at least 100% in the unhardened state in order to ensure easy handling. In the hardened state it is intended not to be brittle but instead to have sufficient impact toughness/flexibility so as not to break under an impact load. The fact that it must additionally exhibit good adhesion after curing, as expressed e.g. in high values for tensile shear (or "lap shear") strength, is self evident.

One subject of the present invention is a thermally hardenable adhesive agent in strip or film form, having a thickness in the range from 0.1 to 5 mm, containing
a) at least one reactive epoxy prepolymer, the latter being by preference at least partly solid at 22° C.,
b) at least one latent hardener for epoxies, and
c) one or more elastomers,
wherein the elastomers are selected from
c1) thermoplastic polyurethanes
c2) thermoplastic isocyanates
c3) block copolymers having thermoplastic polymer blocks.

The epoxy prepolymers, hereinafter also referred to as "epoxy resins," can in principle be saturated, unsaturated, cyclic or acyclic, aliphatic, alicyclic, aromatic, or heterocyclic polyepoxide compounds.

Suitable epoxy resins in the context of the present invention are, for example, preferably selected from epoxy resins of the bisphenol A type, epoxy resins of the bisphenol S type, epoxy resins of the bisphenol F type, epoxy resins of the phenol novolac type, epoxy resins of the cresol novolac type, epoxidized products of numerous dicyclopentadiene-modified phenol resins obtainable by the reaction of dicyclopentadiene with numerous phenols, epoxidized products of 2,2',6,6'-tetramethylbiphenol, aromatic epoxy resins such as epoxy resins having a naphthalene backbone and epoxy resins having a fluorene backbone, aliphatic epoxy resins such as neopentyl glycol diglycidyl ether and 1,6-hexanediol diglycidyl ether, alicyclic epoxy resins such as 3,4-epoxycyclohexylmethyl-3,4-epoxycyclohexane carboxylate and bis(3,4-epoxycyclohexyl)adipate, and epoxy resins having a hetero ring, such as triglycidyl isocyanurate.

The epoxy resins encompass in particular, for example, the reaction product of bisphenol A and epichlorohydrin, the reaction product of phenol and formaldehyde (novolac resins) and epichlorohydrin, glycidyl esters, and the reaction product of epichlorohydrin and p-aminophenol.

Further polyphenols that yield suitable epoxy resin prepolymers by reaction with epichlorohydrin (or epibromohydrin) are: resorcinol, 1,2-dihydroxybenzene, hydroquinone, bis(4-hydroxyphenyl)-1,1-isobutane, 4,4'-dihydroxybenzophenone, bis(4-hydroxyphenyl)-1,1-ethane, and 1,5-hydroxynaphthalene.

Further suitable epoxy prepolymers are polyglycidyl ethers of polyalcohols or diamines. Polyglycidyl ethers of this kind are derived from polyalcohols such as, for example, ethylene glycol, diethylene glycol, triethylene glycol, 1,2-propylene glycol, 1,4-butylene glycol, triethylene glycol, 1,5-pentanediol, 1,6-hexanediol, or trimethylolpropane.

Further preferred epoxy resins that are commercially obtainable encompass, in particular, octadecylene oxide, epichlorohydrin, styrene oxide, vinylcyclohexene oxide, glycidol, glycidyl methacrylate, diglycidyl ethers of bisphenol A (e.g. those that are obtainable under the commercial designations "Epon 828", "Epon 825", "Epon 1004" and "Epon 1010" of Hexion Specialty Chemicals Inc., "DER-331", "DER-332", "DER-334", "DER-732" and "DER-736" of Dow Chemical Co.), vinylcyclohexene dioxide, 3,4-epoxycyclohexylmethyl-3,4-epoxycyclohexene carboxylate, 3,4-epoxy-6-methylcyclohexylmethyl-3,4-epoxy-6-methylcyclohexene carboxylate, bis(3,4-epoxy-6-methylcyclohexylmethyl)adipate, bis(2,3-epoxycyclopentyl)ether, aliphatic epoxide modified with polypropylene glycol, dipentene dioxide, epoxidized polybutadiene (e.g. Krasol products of Sartomer), silicone resins containing epoxide functionality, flame-retardant epoxy resins (e.g. "DER-580", a brominated epoxy resin of the bisphenol type that is obtainable from Dow Chemical Co.), 1,4-butanediol diglycidyl ethers of a phenol/formaldehyde novolac (e.g. "DEN-431" and "DEN-438" of the Dow Chemical Co.), as well as resorcinol diglycidyl ethers (e.g. "Kopoxite" of the Koppers Company Inc.), bis(3,4-epoxycyclohexyl)adipate, 2-(3,4-epoxycyclohexyl-5,5-spiro-3,4-epoxy)cyclohexanemetadioxane, vinylcyclohexene monoxide, 1,2-epoxyhexadecane, alkyl glycidyl ethers such as, for example, C8 to C10 alkyl glycidyl ethers (e.g. "HELOXY Modifier 7" of Hexion Specialty Chemicals Inc.), C12 to C14 alkyl glycidyl ethers (e.g. "HELOXY Modifier 8" of Hexion Specialty Chemicals Inc.), butyl glycidyl ethers (e.g. "HELOXY Modifier 61" of Hexion Specialty Chemicals Inc.), cresyl glycidyl ethers (e.g. "HELOXY Modifier 62" of Hexion Specialty Chemicals Inc.), p-tert-butylphenyl glycidyl ethers (e.g. "HELOXY Modifier 65" of Hexion Specialty Chemicals Inc.), polyfunctional glycidyl ethers such as, for example, diglycidyl ethers of 1,4-butanediol (e.g. "HELOXY Modifier 67" of Hexion Specialty Chemicals Inc.), diglycidyl ethers of neopentyl glycol (e.g. "HELOXY Modifier 68" of Hexion Specialty Chemicals Inc.), diglycidyl ethers of cyclohexanedimethanol (e.g. "HELOXY Modifier 107" of Hexion Specialty Chemicals Inc.), trimethylolethane triglycidyl ethers (e.g. "HELOXY Modifier 44" of Hexion Specialty Chemicals Inc.), trimethylolpropane triglycidyl ethers (e.g. "HELOXY Modifier 48" of Hexion Specialty Chemicals Inc.), polyglycidyl ethers of an aliphatic polyol (e.g. "HELOXY Modifier 84" of Hexion Specialty Chemicals Inc.), polyglycol diepoxide (e.g. "HELOXY Modifier 32" of Hexion Specialty Chemicals Inc.), bisphenol F epoxies (e.g. "EPN-1138" or "GY-281" of Huntsman Int. LLC), 9,9-bis-4-(2,3-epoxypropoxy)phenylfluorenone (e.g. "Epon 1079" of Hexion Specialty Chemicals Inc.).

Further preferred commercially obtainable compounds are selected, for example, from Araldite™ 6010, Araldit™ GY-281 ™, Araldit™ ECN-1273, Araldit™ ECN-1280, Araldit™ MY-720, RD-2 of Huntsman Int. LLC; DEN™ 432, DEN™ 438, DEN™ 485 of Dow Chemical Co., Epon™ 812, 826, 830, 834, 836, 871, 872, 1001, 1031 etc. of Hexion Specialty Chemicals Inc. and HPT™ 1071, HPT™ 1079 likewise of Hexion Specialty Chemicals Inc., as novolac resins furthermore, for example, Epi-Rez™ 5132 of Hexion Specialty Chemicals Inc., ESCN-001 of Sumitomo Chemical, Quatrex 5010 of Dow Chemical Co., RE 305S of Nippon Kayaku, Epiclon™ N673 of DaiNipon Ink Chemistry, or Epicote™ 152 of Hexion Specialty Chemicals Inc.

The following polyepoxides can also be used at least in portions: polyglycidyl esters of polycarboxylic acids, for example reaction products of glycidol or epichlorohydrin with aliphatic or aromatic polycarboxylic acids such as oxalic acid, succinic acid, glutaric acid, terephthalic acid, or dimer fatty acid.

The epoxy equivalent of suitable polyepoxides can vary between 150 and 50,000, by preference between 170 and 5000. For example, an epoxy resin based on epichlorohydrin/bisphenol A that has an epoxy equivalent weight from 475 to 550 g/eq, resp. an epoxy group content in the range from 1820 to 2110 mmol/g, is suitable. The softening point determined in accordance with RPM 108-C is in the range from 75 to 85° C.

At least one epoxy resin that has reactive epoxy groups and is solid at 22° C. is preferably present as component a). It may be helpful, for the adjustment of flexibility, additionally to provide reactive epoxy resins that are liquid or pasty at 22° C.

Thermally activatable or latent hardeners for the epoxy resin binding agent system are used as hardeners. These can be selected from the following compounds: guanidines, substituted guanidines, substituted ureas, melamine resins, guanamine derivatives, cyclic tertiary amines, aromatic amines, and/or mixtures thereof. The hardeners can be incorporated stoichiometrically into the hardening reaction, but also can be catalytically active. Examples of substituted guanidines are methylguanidine, dimethylguanidine, trimethylguanidine, tetramethylguanidine, methylisobiguanidine, dimethylisobiguanidine, tetramethylisobiguanidine, hexamethylisobiguanidine, heptamethylisobiguanidine, and very particularly cyanoguanidine (dicyandiamide). Representatives of suitable guanamine derivatives that may be recited are alkylated benzoguanamine resins, benzoguanamine resins, or methoxymethylethoxymethylbenzoguanamine. Dicyandiamide is preferably suitable.

In addition to or instead of the aforesaid hardeners, catalytically active substituted ureas can be used. These are, in particular, p-chlorophenyl-N,N-dimethylurea (monuron), 3-phenyl-1,1-dimethylurea (fenuron), or 3,4-dichlorophenyl- N,N-dimethylurea (diuron). In principle, catalytically active tertiary acrylamines or alkylamines such as, for example, benzyldimethylamine, tris(dimethylamino)phenol, piperidine, or piperidine derivatives can also be used. In addition, a variety of (by preference, solid) imidazole derivatives can be used as catalytically active accelerators. Representatives that may be named are 2-ethyl-2-methylimidazole, N-butylimidazole, benzimidazole, and N—$C_1$ to $C_{12}$ alkylimidazoles or N-arylimidazoles. Adducts of amino compounds with epoxy resins are also suitable as accelerating additives to the aforesaid hardeners. Suitable amino compounds are tertiary aliphatic, aromatic, or cyclic amines. Suitable epoxy compounds are, for example, polyepoxides based on glycidyl ethers of bisphenol A or F, or of resorcinol. Concrete examples of such adducts are adducts of tertiary amines such as 2-dimethylaminoethanol, N-substituted piperazines, N-substituted homopiperazines, N-substituted aminophenols, with di- or polyglycidyl ethers of bisphenol A or F or of resorcinol.

The elastomer component (c) can represent a thermoplastic polyurethane (c1) that can be reactive or nonreactive. In a preferred embodiment the thermoplastic polyurethane is nonreactive, in the sense that it is not further crosslinkable. The polyurethane in this context can be, in particular, one that contains a polyester chain.

The term "thermoplastic polyurethane" (often abbreviated "TPU") is known to one skilled in the art under discussion here. A TPU is an at least substantially linear polymer that is formed by a polymerization reaction of three initial components:
1. a diisocyanate,
2. a short-chain diol (often referred to as a "chain lengthener" of the general formula (OH—R—OH), where R denotes a hydrocarbon residue having 1 to 4 carbon atoms,
3. a long-chain diol (OH—Z—OH), the group Z denoting a polymer chain that results in a so-called "soft segment" of the polyurethane that is obtained. The group Z can represent, for example, a polyether chain or polyester chain. Polyether chains can be formed by ring-opening polymerization of alkylene oxides such as, for example, ethylene oxide or propylene oxide, or by a corresponding reaction of saturated oxygen-containing heterocycles such as, for example, tetrahydrofuran. Polyester chains are created by reacting divalent alcohols with dibasic carboxylic acids. A preferred polyester chain is made of polycaprolactone polyester.

Reaction of these three components yields a polyurethane that contains alternating soft segments and hard segments. The soft segments are formed by the group Z, and the hard segments result from the diisocyanate and the short-chain diol.

The polarity of the hard segments results in a strong attraction among them, which in turn results in a high degree of aggregation and order in the solid phase of the polymer. This produces crystalline or pseudo-crystalline regions that are embedded in the soft and flexible matrix of the soft segments. The crystalline and pseudo-crystalline regions of the hard segments act as a physical link, imparting a high degree of elasticity to the TPU. The flexible chains of the soft segments contribute to the elongation behavior of the polymers.

The thermoplastic polyurethane c1) is preferably solid at room temperature (22° C.) and has a glass transition temperature below −20° C., by preference below −25° C. The thermoplastic polyurethane c1) that is by preference solid at room temperature furthermore has a melting range or softening range (per Kofler) that begins above 100° C., by preference above 115° C. Suitable polyurethanes c1) that are by preference solid at room temperature are further notable for the fact that they have, as a pure substance, an elongation at fracture of at least 300%, by preference at least 400%. Particularly suitable as thermoplastic polyurethanes c1) having these properties are those that contain a polycaprolactone-polyester chain or a polyester chain.

The weight-average molar mass (Mw) of suitable polyurethanes c1), as determinable by gel permeation chromatography, is preferably in the range from 50,000 g/mol to 120,000 g/mol, in particular in the range from 55,000 g/mol to 90,000 g/mol.

Suitable thermoplastic polyurethanes that meet the preceding criteria are obtainable commercially and can be acquired on the basis of these specifications, for example, from the Merquinsa company in Spain or from Danquinsa GmbH in Germany.

Instead of or together with the reactive (crosslinkable) or nonreactive (non-crosslinkable) thermoplastic polyurethanes c1), the adhesive agent can contain thermoplastic isocyanates. These can be further crosslinked, and react e.g. with alcohol to yield thermoplastic polyurethanes that in turn can meet the criteria for component c1). These thermoplastic isocyanates can be, for example, isocyanate-terminated polyether polyols, in particular those that have a molar mass in the range between 1000 and 10,000 g/mol.

Instead of or together with the reactive (crosslinkable) or nonreactive (non-crosslinkable) thermoplastic polyurethanes c1) and/or the thermoplastic isocyanates c2), the adhesive agent can contain as a component c3) block copolymers having thermoplastic polymer blocks. These are by preference selected from those that contain a first polymer block having a glass transition temperature below 15° C., in particular below 0° C., and a second polymer block having a glass transition temperature above 25° C., in particular above 50° C. Also suitable are those block copolymers that are selected from those in which a first polymer block is selected from a polybutadiene or polyisoprene block, and a second polymer block is selected from a polystyrene or polymethyl methacrylate block.

Block copolymer c3) is selected, for example, from copolymers having the following block configuration: styrene-butadiene-(meth)acrylate, styrene-butadiene-(meth) acrylic acid ester, ethylene-(meth)acrylic acid ester-glycidyl (meth)acrylic acid ester, ethylene-(meth)acrylic acid ester-maleic acid anhydride, (meth)acrylic acid ester-butyl acrylate-(meth)acrylic acid ester, by preference methyl methacrylate-butyl acrylate-methyl methacrylate.

The composition of these block copolymers is defined above by indicating the monomer unit for each block. This is to be understood to mean that each block copolymer contains polymer blocks made of the recited monomers. In the context of the individual polymer blocks, up to 20 mol % of the recited monomers can be replaced by other co-monomers. This applies in particular to blocks of polymethyl methacrylate.

The block copolymers recited above correspond to those that can also be used in the context of WO 2007/025007. More detailed information thereon, and further block copolymers also suitable in the context of the present invention, may be gathered from page 25, line 21 to page 26, line 9 of that document. Also to be found therein are cross-references to documents in which the manufacture of such block copolymers is described.

In addition to the components described above, the adhesive agent according to the present invention can contain as a further component d) rubber particles, preferably those that have a core shell structure.

It is preferred in this context that the rubber particles having a core-shell structure comprise a core made of polymer material having a glass transition temperature below 0° C. and a casing made of a polymer material having a glass transition temperature above 25° C. Particularly suitable rubber particles having a core-shell structure can comprise a core made of a diene homopolymer, a diene copolymer, or a polysiloxane elastomer, and/or a shell made of an alkyl(meth)acrylate homopolymer or copolymer.

The core of these core-shell particles can, for example, contain a diene homopolymer or copolymer, which can be selected from a homopolymer of butadiene or isoprene, a copolymer of butadiene or isoprene with one or more ethylenically unsaturated monomers, for example vinyl aromatic monomers, (meth)acrylonitrile, (meth)acrylates, or similar monomers. The polymer or copolymer of the shell can contain as monomers, for example: (meth)acrylates such as in particular methyl methacrylate, vinyl aromatic monomers (e.g. styrene), vinyl cyanides (e.g. acrylonitrile), unsaturated acids or anhydrides (e.g. acrylic acid), (meth)acrylamides, and similar monomers that result in polymers having a suitably high glass temperature.

The polymer or copolymer of the shell can comprise acid groups that can crosslink by metal carboxylate formation, for example by forming a salt with divalent metal cations. The polymer or copolymer of the shell can furthermore be covalently crosslinked by utilizing monomers that comprise two or more double bonds per molecule.

Other rubber-like polymers, for example poly(butyl acrylate), or polysiloxane elastomers, for example polydimethylsiloxane, in particular crosslinked polydimethylsiloxane, can be used as a core.

These core-shell particles are typically constructed so that the core accounts for 50 to 95 wt % of the core-shell particle, and the shell for 5 to 50 wt % of said particle.

By preference, these rubber particles are relatively small. For example, the average particle size (as determinable, for example, using light scattering methods) can be in the range from approximately 0.03 to approximately 2 μm, in particular in the range from approximately 0.05 to approximately 1 μm. Smaller core-shell particles can, however, also be used, for example those whose average diameter is less than approximately 500 nm, in particular less than approximately 200 nm. For example, the average particle size can be in the range from approximately 25 to approximately 200 nm.

The manufacture of such core-shell particles is known in the existing art, as indicated for example on page 6, lines 16 to 21 of WO 2007/025007. Commercial procurement sources for core-shell particles of this kind are listed in this document in the last paragraph of page 6 to the first paragraph of page 7. Reference to said procurement sources is hereby made. Reference is further made to manufacturing methods for such particles that are described in the aforesaid document from page 7, second paragraph to page 8, first paragraph. For more detailed information about suitable core-shell particles, reference is likewise made to the aforesaid document WO 2007/025007, which contains extensive information thereon from page 8, line 15 to page 13, line 15.

Inorganic particles that comprise a casing made of organic polymers can take on the same function as the rubber particles recited above having a core-shell structure. A further preferred embodiment of the present invention is therefore characterized in that the compound according to the present invention contains, as an additional component e) inorganic particles that comprise a casing made of organic polymers.

In this embodiment the adhesive agent according to the present invention contains inorganic particles that comprise a casing made of organic polymers, the organic polymers preferably being selected from homo- or copolymers of acrylic acid esters and/or methacrylic acid esters, and being made up of at least 30 wt % polymerized-in esters of acrylic acid and/or methacrylic acid.

The esters of acrylic acid and/or of methacrylic acid preferably represent methyl esters and/or ethyl esters; particularly preferably, at least a portion of the esters are present as methyl esters. In addition, the polymers can also contain unesterified acrylic acid and/or methacrylic acid, which can improve the attachment of the organic polymers onto the surface of the inorganic particles. It is therefore particularly preferred in this case if the monomer units made up of unesterified acrylic acid and/or methacrylic acid are located at or close to that end of the polymer chain which binds to the surface of the inorganic particles.

It is preferred in this context that the organic polymers be made up of at least 80 wt % esters of acrylic acid and/or of methacrylic acid. In particular, they can contain 90 wt %, 95 wt %, or be made up entirely, thereof. If the organic polymers contain monomers other than these esters of acrylic acid and/or of methacrylic acid resp. unesterified acrylic acid and/or methacrylic acid, they are selected by preference from comonomers that comprise epoxy, hydroxy, and/or carboxyl groups.

The organic polymers of the casing are by preference uncrosslinked, or so weakly crosslinked that no more than 5% of the monomer units of one chain are crosslinked with monomer units of another chain. It may be advantageous in this context for the polymers to be more greatly crosslinked in the vicinity of the surface of the inorganic particles than farther out in the casing. In particular, the casing is by preference constructed so that at least 80%, in particular at least 90%, and particularly preferably 95% of the polymer chains are attached at one end to the surface of the inorganic particles.

The inorganic particles by preference have, before application of the casing made of organic polymers, an average particle size in the range from 1 to 1000, in particular in the range from 5 to 30 nm. It is known that the particle size can be determined by light scattering methods and by electron microscopy.

The casing made of organic polymers has a lower density than the inorganic particles themselves. The casing made of organic polymers preferably has a thickness such that the weight ratio of the inorganic core to the casing made of organic polymers is in the range from 2:1 to 1:5, by preference in the range from 3:2 to 1:3. This can be controlled by selecting the reaction conditions during growth of the casing made of organic polymers onto the inorganic particles.

In general, the inorganic particles can be selected from metals, oxides, hydroxides, carbonates, sulfates, and phosphates. Mixed forms made up of oxides, hydroxides, and carbonates, for example basic carbonates or basic oxides, can also be present. If inorganic particles made of metals are selected, then iron, cobalt, nickel, or alloys that are made up of at least 50 wt % of one of said metals, are preferably suitable. Oxides, hydroxides, or mixed forms thereof are preferably selected from those of silicon, cerium, cobalt, chromium, nickel, zinc, titanium, iron, yttrium, zirconium, and/or aluminum. Mixed forms of these are also possible, for example particles made of aluminosilicates or silicate glasses. Zinc oxide, aluminum oxides or hydroxides, and $SiO_2$ or the oxide forms of silicon referred to as "silicic acid" or "silica," are particularly preferred. The inorganic particles can furthermore be made up of carbonates, for example calcium carbonate, or of sulfates, for example barium sulfate. It is of course also possible for particles having inorganic cores of different compositions to be present alongside one another.

In order to manufacture the inorganic particles that comprise a casing made of organic polymers, it is possible to proceed, for example, as described in WO 2004/111136 A1 using the example of coating zinc oxide with alkylene ether-carboxylic acids. According to this procedure, the untreated inorganic particles are suspended in a nonpolar or weakly polar solvent, monomeric or prepolymeric constituents of the casing are then added, the solvent is removed, and polymerization is started, for example radically or photochemically. It is further possible to proceed by analogy with the manufacturing method described in EP 1 469 020 A1, in which monomers or prepolymers of the casing material are used as organic coating components for the particles. Also possible is manufacture of the encased particles by "atom transfer radical polymerization," as has been described, using the example of the polymerization of n-butyl acrylate onto silicic acid nanoparticles, in: G. Carrot, S. Diamanti, M, Manuszak, B. Charleux, J.-P. Vairon, "Atom transfer radical polymerization of n-butyl acrylate from silica nanoparticles," J. Polym. Sci., Part A: Polymer Chemistry, Vol. 39, 4294-4301 (2001).

Manufacturing methods such as those as described in WO 2006/053640 can also be resorted to. For the present invention, the inorganic cores to be selected in this context are those described, with their manufacturing methods, on page 5, line 24 to page 7, line 15 of WO 2006/053640. The coating of these cores is accomplished in a manner analogous to that described on page 10, line 22 to page 15, line 7 of this document. The recommendation of this document (page 15, lines 9 to 24) to subject the inorganic cores to a pretreatment before the jacket is polymerized on, can also be followed. What is stated on this subject at the location cited is:

"In particular when inorganic cores are used, it may also be preferred for the core to be subjected, before the jacket is polymerized on, to a pretreatment that enables attachment of the jacket. This can usually consist in a chemical functionalization of the particle surface, as is known from the literature from a very wide variety of inorganic materials. It may be particularly preferred in this context to apply onto the surface those chemical functions that, as a reactive chain end, enable grafting of the jacket polymers. Terminal double bonds, epoxy functions, and polycondensable groups may be mentioned here, in particular, as examples. The functionalization of hydroxy-group-carrying surfaces with polymers is known, for example, from EP-A-337 144."

The adhesive agent according to the present invention can contain either only the aforesaid rubber particles, or only the aforesaid encased inorganic particles, or both particle types simultaneously.

If the adhesive agent according to the present invention is used for adhesive bonding of smooth, planar substrates such as, for example, metal panels, or in general for repair purposes, it is not necessary for it to be thermally expandable during or before curing. It therefore need not obligatorily contain a blowing agent. When rough or porous substrates are being connected, or components such as, for example, pipes that are mechanically joined, for example inserted into one another, before bonding, it may be useful for the adhesive agent to be thermally expandable in order to fill up cavities or interstices between the joined parts. For such applications, it is preferred that the adhesive agent additionally contain f) at least one blowing agent.

All known blowing agents are suitable in principle as a blowing agent, for example the "chemical blowing agents" that release gases by decomposition, or "physical blowing agents," i.e. expanding hollow spheres. Examples of the former blowing agents are azobisisobutyronitrile, azodicarbonamide, di-nitrosopentamethylenetetramine, 4,4'-oxybis (benzenesulfonic acid hydrazide), diphenylsulfone-3,3'-disulfohydrazide, benzene-1,3-disulfohydrazide, p-toluenesulfonyl semicarbazide. The expandable hollow plastic microspheres based on polyvinylidene chloride copolymers or acrylonitrile-(meth)acrylate copolymers are particularly preferred. These are commercially obtainable, for example, under the names "Dualite®" resp. "Expancel®" from the Pierce & Stevens resp. Casco Nobel companies.

The quantity of blowing agent is preferably selected so that the volume of compound irreversibly increases, upon heating to activation temperature (or expansion temperature), by at least 1%, by preference at least 5%, and in particular at least 10%. This is to be understood to mean that upon heating to activation temperature the compound, in addition to the normal and reversible thermal expansion in accordance with its coefficient of thermal expansion, irreversibly increases its volume, as compared with the initial volume at room temperature (22° C.), in such a way that after being cooled back to room temperature it is at least 1%, by preference at least 5%, and in particular at least 10% larger than before. The expansion factor indicated thus refers to the volume of the compound at room temperature before and after temporary heating to activation temperature. The upper limit of the expansion factor, i.e. the irreversible volume increase, can be set by selecting the quantity of blowing agent, in such a way that it is less than 300%, in particular less than 200%.

Thermal conduction in the adhesive agent, and thus its curing behavior, can be improved by adding particles that readily conduct heat, for example metal powders (which includes powders made of metal alloys). An embodiment of the adhesive agent according to the present invention therefore consists in the fact that it additionally contains g) metal powders. Suitable metal powders can be selected from powders of iron (in particular steel), aluminum, zinc, copper, or alloys that contain at least 50 wt % of one of these elements. It is preferable to use metal powders in which 90 wt % of the particles have a particle size, determinable by sieve analysis, in the range between 10 and 100 µm.

As a rule, the adhesive agents according to the present invention further contain fillers known per se, for example the various milled or precipitated chalks, carbon black, calcium magnesium carbonates, talc, barite, silicic acids or silica, and in particular silicate fillers of the aluminum magnesium calcium silicate type, for example wollastonite, chlorite.

For weight reduction, the adhesive agent can also contain, in addition to the aforesaid "normal" fillers, so-called lightweight fillers. These can be selected from the group of the hollow metal spheres such as, for example, hollow steel spheres, hollow glass spheres, fly ash (fillite), hollow plastic spheres based on phenol resins, epoxy resins or polyesters, expanded hollow microspheres having a wall material made of (meth)acrylic acid ester copolymers, polystyrene, styrene/(meth)acrylate copolymers, and in particular of polyvinylidene chloride as well as copolymers of vinylidene chloride with acrylonitrile and/or (meth)acrylic acid esters, ceramic hollow spheres, or organic lightweight fillers of natural origin such as ground nut shells, for example the shells of cashew nuts, coconuts, or peanuts, as well as cork flour or coke powder. Particularly preferred in this context are those lightweight fillers, based on hollow microspheres, that ensure high compressive strength in the cured adhesive agent.

In one possible embodiment, the adhesive agent additionally contains fibers, for example based on aramid fibers, carbon fibers, metal fibers (made, for example, of aluminum), glass fibers, polyamide fibers, polyethylene fibers, or polyester fibers, these fibers by preference being pulp fibers or staple fibers that have a fiber length between 0.5 and 6 mm and a diameter from 5 to 20 μm. Polyamide fibers of the aramid fiber type, or also polyester fibers, are particularly preferred in this context.

The hardenable compounds according to the present invention can further contain common additional adjuvants and additives such as, for example, plasticizers, rheology adjuvants, wetting agents, adhesion promoters, aging protection agents, stabilizers, and/or color pigments.

The adhesive agent preferably contains the individual components in the quantitative ranges indicated below. The quantitative indications are to be understood as a percentage by weight based on the complete adhesive agent, and the quantities are to be selected so as to yield a total of 100 wt %:

a) Reactive epoxy prepolymer: at least 20, by preference at least 30 wt %, and up to 80, by preference up to 70, and in particular up to 60 wt %. In this context, either the entire proportion of epoxy prepolymer is solid at 22° C., or a mixture of reactive epoxy prepolymers is used, a portion of the epoxy prepolymer being solid at 22° C. and another portion of the epoxy prepolymers being liquid or pasty at 22° C. ("Pasty" means that the compound can be spread out into a film.) By way of the mixing ratio of epoxy prepolymers that are solid and liquid at 22° C., it is possible to adjust whether or not the adhesive agent is tacky at 22° C.: the less liquid epoxy prepolymer used, the lower the tack. For example, the quantitative ratio between epoxy prepolymers solid at 22° C. and liquid or pasty at 22° C. can be in the range from 10:1 to 1:10.

b) Latent hardener for epoxies: at least 1, by preference at least 2 wt %, and up to 10, by preference up to 8 wt %. A hardening accelerator can additionally be provided. If desired, the latter can be present in a quantity in a range from at least 0.1, by preference at least 0.5 wt %, and up to 6 wt %, by preference up to 5 and in particular up to 3 wt %.

c) One or more elastomers selected from: c1) thermoplastic polyurethanes, c2) thermoplastic isocyanates, c3) block copolymers having thermoplastic polymer blocks: in total at least 1, by preference at least 5, and in particular at least 10 wt %, and up to 70, by preference up to 50 wt %. Only one of components c1) to c3), or two of said components, or all three components, can be present. Particularly preferably, at least one of components c1) and c2), particularly preferably component c1), is present. Together with the latter, component c3) is by preference additionally used. In this case component c1) and/or c2) is present in total at a proportion of at least 1, by preference at least 5 wt %, and up to 35, by preference up to 25 wt %, and component c3) at a proportion of at least 1 wt % and up to 35 wt %, by preference up to 25 wt %. In addition to these elastomers, the adhesive agent can contain further polymers and copolymers having elastomer properties, or rubber particles d) preferably having a core-shell structure, for example copolymers of dienes (such as butadiene, isoprene) and (meth)acrylic acid or esters thereof. These can be present in quantitative proportions (based on the total adhesive agent) of up to 20 wt % and in particular up to 10 wt %, and by preference of more than 1 wt %, in particular more than 4 wt %.

e) Inorganic particles that comprise a shell made of organic polymers: not obligatorily necessary. If present: by preference a total of at least 5, by preference at least 10 wt %, and up to 45, by preference up to 35, and in particular up to 25 wt %. Quantities between 0 and 5 wt % are likewise possible.

f) Blowing agent: not necessary if the adhesive agent is not intended to be thermally expandable. If a thermally expandable adhesive agent is desired, the proportion of blowing agent required depends on the desired expansion factor, and can be ascertained empirically. A blowing agent content in the range from 0.2 to 1.5 wt % can serve as a starting point. Blowing agent contents of up to 5 and up to 10 wt % are, however, also possible.

g) Metal powder: not obligatorily necessary. If present: by preference at least 0.1, in particular at least 5 wt %, and up to 40, by preference up to 25 wt %.

Further adjuvants such as fillers and color pigments: zero to a total of 60, by preference up to a total of 40 wt %, in particular up to a total of 20 wt %, and by preference at least 5, in particular at least 10 wt %.

The adhesive agent described above can be configured, depending on the intended use, so that it is either tacky or not at room temperature (22° C.). As explained earlier, this can be adjusted in particular by way of the quantitative ratio between liquid and solid epoxy prepolymers.

As a result of the combination of raw materials according to the present invention, the adhesive agent in strip or film form is, in the unhardened state at room temperature (22° C.), bendable (i.e. it can easily be bent over 90 degrees or more by hand) or even wrappable (i.e. it can be rolled up by hand into a roll without thereby needing to produce an inner cavity). In the unhardened state at 22° C., it can be elongated at least 100% before tearing. It can therefore be adapted to different substrate geometries and, in particular, wrapped around cylindrical objects.

For easier handling, the adhesive agent in strip or film form can be laid onto a substrate, for example a carrier foil. Particularly suitable for this purpose is, for example, a carrier foil made of metal, for example aluminum. Depending on the intended use, this foil can have a different stiffness that can be between rigid and easily bendable. A "carrier foil" is understood in this context as a substrate that remains on the adhesive agent after curing. Irrespective thereof, for easier handling it is to be preferred that the adhesive agent be covered on one or both sides with a pull-off film such as, for example, a release paper (e.g. siliconized paper) that is pulled off before use resp. before curing. Also possible are embodiments in which the adhesive agent applied in strip or film form is covered on the one side with a foil, for example a metal foil, and on the other side with a release paper. This is the case in particular when the adhesive agent is adjusted to be tacky at room temperature.

For manufacture of the adhesive agent according to the present invention, the individual components are mixed with one another, by preference at a temperature in the range from 50 to 120° C. (depending on the process step). If this occurs in an agitator vessel or kneader, the mixture can then be poured out onto a substrate such as, for example, a release paper, and stretched or rolled out into a strip resp. a film. As an alternative thereto, the components can be mixed in a mixing chamber of an extruder and then extruded through a correspondingly shaped extrusion die in the shape of a strip, if desired likewise onto a release paper. In both cases, a carrier foil such as, for example, a metal foil can be used instead of the release paper.

For the joining of objects, the adhesive agent is applied on one or both sides onto two surfaces to be joined next to one another, or put in place between the surfaces to be joined. If the adhesive agent is tacky at room temperature, an initial immobilization is thereby already achieved. For curing, the joined parts along with the adhesive agent are heated to a temperature in the range from approximately 60 to approximately 200° C., in particular between 100 and 180° C. The heating time period can be between approximately 1 and 120 minutes, by preference between approximately 5 and approximately 45 minutes. If the adhesive agent contains blowing agent, it becomes expanded simultaneously with curing.

The adhesive agent is therefore generally suitable for the adhesive bonding of planar, tubular, or cylindrical components. These components can be produced from various materials, for example metal, wood, ceramic, or ferrites. The parts to be joined can belong to different material groups.

The adhesive agent is suitable in particular for connecting pipes. The present invention therefore also relates to a method for connecting pipes, a first pipe comprising an end portion in which an end portion of a second pipe is receivable, an adhesive film being applied onto the end portion of the second pipe, the end portion of the second pipe having the applied adhesive film being introduced into the end portion of the first pipe, and the adhesive film being cured by heating.

A possible procedure for this and similar applications is to immobilize with respect to one another the pipe ends to be fitted into one another using a (preferably electrically) heatable clamp, to activate the heating device of the clamp, and thereby to heat the end portions of the pipe fitted into one another in such a way that the adhesive agent cures. Instead of the heatable clamp, it is also possible to attach a heatable sleeve or the like around the end portions of the pipes, or other parts, to be fitted into one another, and therewith to heat the end portions fitted into one another. Heating in a heating oven is of course also possible, depending on the nature of the parts being joined.

The adhesive agent according to the present invention is, however, suitable not only for joining components but also for single-sided coating of components. This can desirably influence the vibration behavior of such components, for example for purposes of acoustic damping.

EXAMPLES

Raw materials 1 to 7 according to the table below were mixed with one another at a temperature of 120° C. in a planetary mixer. The further process steps occurred at a temperature of 60° C. max.

Using a heatable press, the material was shaped into strips having a thickness of 0.2 mm.

Quantity Indications in wt %

| | Example 1 | Example 2 |
|---|---|---|
| 1 Epoxy resin solid at 22° C. (Epon ™ 1001) | 28.80 | 28.90 |
| 2 Epoxy resin liquid at 22° C. | 21.6 | 21.7 |
| 3 Butadiene-acrylic copolymer | 7.2 | 7.2 |
| 4 Thermoplastic polyurethane (Pearlcoat ™ 125K) | 14.40 | 14.40 |
| 5 $CaCO_3$ | 10.50 | 10.60 |
| 6 Aluminum powder | 9.60 | 0.00 |
| 7 Coated aluminum powder | 0.00 | 9.60 |
| 8 Dicyandiamide | 4.00 | 4.00 |
| 9 Accelerator (Ajicure ™ AH30) | 1.90 | 1.90 |
| 10 Expandable microspheres | 0.80 | 0.50 |
| 11 Pyrogenic silicic acid | 1.00 | 1.00 |
| 12 Color pigment (carbon black) | 0.20 | 0.20 |

Foaming Behavior

| | Example 1 | Example 2 |
|---|---|---|
| | Hardening conditions: 150° C.-37 minutes | |
| Density [g/cm³] (before hardening) | 1.26 | 1.25 |
| Expansion rate [%] (open space) | 60% | 40% |
| Density after hardening [g/cm³] | 0.79 | 0.89 |

Test results:

Lap Shear Strength (LSS)-10 mm Overlap

| Testing rate: 20 mm/min | | Example 1 | Example 2 |
|---|---|---|---|
| I. | Curing: | 180° C.-10 minutes | |
| | Substrate: | Cold-rolled steel (CRS) DC 05 (1.5 mm) | |
| | LSS (MPa) | 22.6 | 26.0 |
| | Substrate: | Aluminum AC170 (0.8 mm) | |
| | LSS (MPa) | 17.1 | 18.9 |
| II. | Curing: | 150° C.-5 minutes | |
| | Substrate: | CRS DC 05 (1.5 mm) | |
| | LSS (MPa) | 8.2 | 9.9 |

Bonded area = 25 * 10 mm, adhesive layer thickness = 0.2 mm
In all instances, 100% cohesive fracture was observed.

The invention claimed is:

1. An adhesive material for the joining of pipes comprising a thermally curable adhesive agent in strip or film form having a thickness of 0.1 to 5 mm, said thermally curable adhesive agent in strip or film form comprising:
   a) at least one reactive epoxy prepolymer comprising an epoxy resin that is solid at 22° C.,
   b) at least one latent hardener for epoxies, and
   c) one or more block copolymers selected from the group consisting of:
   styrene-butadiene-(meth)acrylate,
   styrene-butadiene-(meth)acrylic acid ester,
   ethylene-(meth)acrylic acid ester-glycidyl(meth)acrylic acid ester,
   ethylene-(meth)acrylic acid ester-maleic acid anhydride, and
   methyl methacrylate-butyl acrylate-methyl methacrylate;
   when said adhesive material comprises the thermally curable adhesive agent in strip form, the adhesive material comprises a free-standing extruded strip of the thermally curable adhesive agent or an extruded strip of the thermally curable adhesive agent covered on one side with a carrier foil or a release paper and optionally covered on its other side with a release paper;
   when said adhesive material comprises the thermally curable adhesive agent in film form, the adhesive material comprises a film of the thermally curable adhesive agent on a carrier foil or a release paper and optionally covered with a release paper;
   wherein curing of the thermally curable adhesive agent is initiated when heated to temperatures in a range from about 60° C. to about 200° C.; and
   wherein the thermally curable adhesive agent in strip or film form at 22° C. is bendable or wrappable and can be elongated at least 100% before it tears.

2. The adhesive material according to claim 1, wherein the one or more block copolymers contain blocks having a glass transition temperature below 15° C. and blocks having a glass transition temperature above 25° C.

3. The adhesive material according to claim 1, wherein the thermally curable adhesive agent in strip or film form further comprises d) rubber particles.

4. The adhesive material according to claim 1, wherein the thermally curable adhesive agent in strip or film form further comprises e) inorganic particles having a shell constructed of organic polymers.

5. The adhesive material according to claim 1, wherein the thermally curable adhesive agent in strip or film form further comprises f) at least one blowing agent.

6. The adhesive material according to claim 1, wherein the thermally curable adhesive agent in strip or film form further comprises g) metal powder.

7. The adhesive material according to claim 1 comprising: an extruded strip of the thermally curable adhesive agent covered on one side with a carrier foil or a release paper and optionally covered on its other side with a release paper; or a film of the thermally curable adhesive agent on a carrier foil or a release paper and optionally covered with a release paper.

8. A method for connecting pipes, comprising the steps of:
providing a first pipe and a second pipe, wherein the first pipe comprises an end portion dimensioned and disposed to receive an end portion of the second pipe;

providing the adhesive material according to claim 1;

removing a first release paper, as necessary, to expose one side of the thermally curable adhesive agent in strip or film form;

applying the adhesive material onto the end portion of the second pipe such that the thermally curable adhesive agent is in contact with the end portion of the second pipe;

removing a second release paper, as necessary, to expose another side of the thermally curable adhesive agent;

joining the end portion of the first pipe with the end portion of the second pipe such that the thermally curable adhesive agent is disposed between the end portions of the first and second pipes; and exposing the joined ends of the first pipe and the second pipe to temperatures in a range of about 60° C. to about 200° C. to cure the thermally curable adhesive agent.

9. A connected pair of pipes produced by the method according to claim 8.

* * * * *